(12) United States Patent
Johnson

(10) Patent No.: US 11,019,466 B1
(45) Date of Patent: May 25, 2021

(54) VEHICLE-LOCATING FLAG

(71) Applicant: Donald Johnson, Shaw AFB, SC (US)

(72) Inventor: Donald Johnson, Shaw AFB, SC (US)

( * ) Notice: Subject to any disclaimer, the term of this patent is extended or adjusted under 35 U.S.C. 154(b) by 63 days.

(21) Appl. No.: 16/545,009

(22) Filed: Aug. 20, 2019

(51) Int. Cl.
| | |
|---|---|
| *H04W 4/02* | (2018.01) |
| *H04W 4/12* | (2009.01) |
| *B60R 11/02* | (2006.01) |
| *B60Q 1/26* | (2006.01) |
| *B60L 1/14* | (2006.01) |
| *G09F 17/00* | (2006.01) |
| *H04W 76/10* | (2018.01) |
| *G01S 19/03* | (2010.01) |
| *H02J 7/00* | (2006.01) |
| *B60R 16/033* | (2006.01) |

(Continued)

(52) U.S. Cl.
CPC ............... *H04W 4/12* (2013.01); *B60L 1/14* (2013.01); *B60Q 1/2615* (2013.01); *B60Q 1/2657* (2013.01); *B60Q 1/2692* (2013.01); *B60R 11/02* (2013.01); *B60R 16/033* (2013.01); *G01S 19/03* (2013.01); *G09F 17/00* (2013.01); *H02J 7/0045* (2013.01); *H04W 76/10* (2018.02); *B60R 2011/004* (2013.01); *B60R 2011/0059* (2013.01); *G09F 2017/0025* (2013.01); *G09F 2017/0075* (2013.01); *H04W 84/042* (2013.01)

(58) Field of Classification Search
CPC ....... H04W 4/021; H04W 4/02; H04W 4/029; H04W 4/027; H04W 4/80; H04W 64/00; H04W 8/20; H04W 4/00; H04W 4/06; H04W 72/04; H04W 12/00; H04W 8/24; H04W 4/50; H04W 60/04; H04W 72/12; H04W 52/24; H04W 52/08; H04W 40/02; H04W 4/20; F21Y 2107/30; F21Y 2115/10; G01S 19/48; G01S 5/0009; G01S 5/021; G01S 5/0236; G01S 5/0257; G01S 3/7867; G01S 5/0027; G01S 5/02; G01S 5/00; G01S 19/24; G01S 1/00; G01S 13/00; G01S 13/08; G01S 13/87; G01S 3/02; G01S 5/14
See application file for complete search history.

(56) References Cited

U.S. PATENT DOCUMENTS

| | | | |
|---|---|---|---|
| 5,233,938 A | * | 8/1993 | Lalo ................. B60R 13/005 116/173 |
| D359,924 S | | 7/1995 | Grumbeck |

(Continued)

FOREIGN PATENT DOCUMENTS

GB          2288904          6/1995

*Primary Examiner* — Quan M Hua
(74) *Attorney, Agent, or Firm* — Kyle A. Fletcher, Esq.

(57) ABSTRACT

The vehicle-locating flag is a signal device. The vehicle-locating flag is configured for use with a vehicle. The vehicle further comprises a door and an electrical system. The vehicle-locating flag attaches to the door of the vehicle. The vehicle-locating flag is configured for use with a fob. The vehicle-locating flag comprises a display structure and a control circuit. The display structure visibly displays the location of the vehicle. The control circuit operates a strobe light that draws attention to the location of the display structure. The control circuit transmits an SMS message containing the location of the vehicle over a commercially provided and publicly available cellular wireless network to a personal data device. The fob transmits a radio frequency signal to initiate the operation of the control circuit.

18 Claims, 4 Drawing Sheets

(51) Int. Cl.
　　 *H04W 84/04* 　　(2009.01)
　　 *B60R 11/00* 　　(2006.01)

(56) References Cited

U.S. PATENT DOCUMENTS

| | | |
|---|---|---|
| 5,786,758 A | 7/1998 | Bullock |
| 5,933,081 A | 8/1999 | Jones |
| 6,298,803 B1 | 10/2001 | Gregg |
| 6,378,453 B1 | 4/2002 | Conway |
| 6,580,368 B1 * | 6/2003 | Jacobs ............ B60Q 1/482 |
| | | 116/209 |
| 7,119,679 B1 | 10/2006 | Crom |
| 7,385,526 B1 | 6/2008 | Bullard |
| 9,821,709 B1 * | 11/2017 | Campbell ......... B60Q 1/2657 |
| 2007/0138347 A1 * | 6/2007 | Ehlers ............ G08G 1/096844 |
| | | 246/1 R |
| 2008/0252431 A1 * | 10/2008 | Nigam ............ G08G 1/205 |
| | | 340/426.1 |
| 2012/0130636 A1 * | 5/2012 | Westerlage ......... G08G 1/20 |
| | | 701/517 |
| 2015/0192420 A1 * | 7/2015 | Watters ............ G01C 21/3407 |
| | | 701/410 |

\* cited by examiner

VEHICLE-LOCATING FLAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and instruments including traffic control systems, more specifically, a device that indicates the location of a vehicle. (G08G1/123)

SUMMARY OF INVENTION

The vehicle-locating flag is a signal device. The vehicle-locating flag is configured for use with a vehicle. The vehicle further comprises a door and an electrical system. The vehicle-locating flag attaches to the door of the vehicle. The vehicle-locating flag is configured for use with a fob. The vehicle-locating flag comprises a display structure and a control circuit. The display structure visibly displays the location of the vehicle. The control circuit operates a strobe light that draws attention to the location of the display structure. The control circuit transmits an SMS message containing the location of the vehicle over a commercially provided and publicly available cellular wireless network to a personal data device. The fob transmits a radio frequency signal to initiate the operation of the control circuit.

These together with additional objects, features and advantages of the vehicle-locating flag will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle-locating flag in detail, it is to be understood that the vehicle-locating flag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle-locating flag.

It is therefore important that the claims be regarded as including such equivalent construction insofar as they do not depart from the spirit and scope of the vehicle-locating flag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
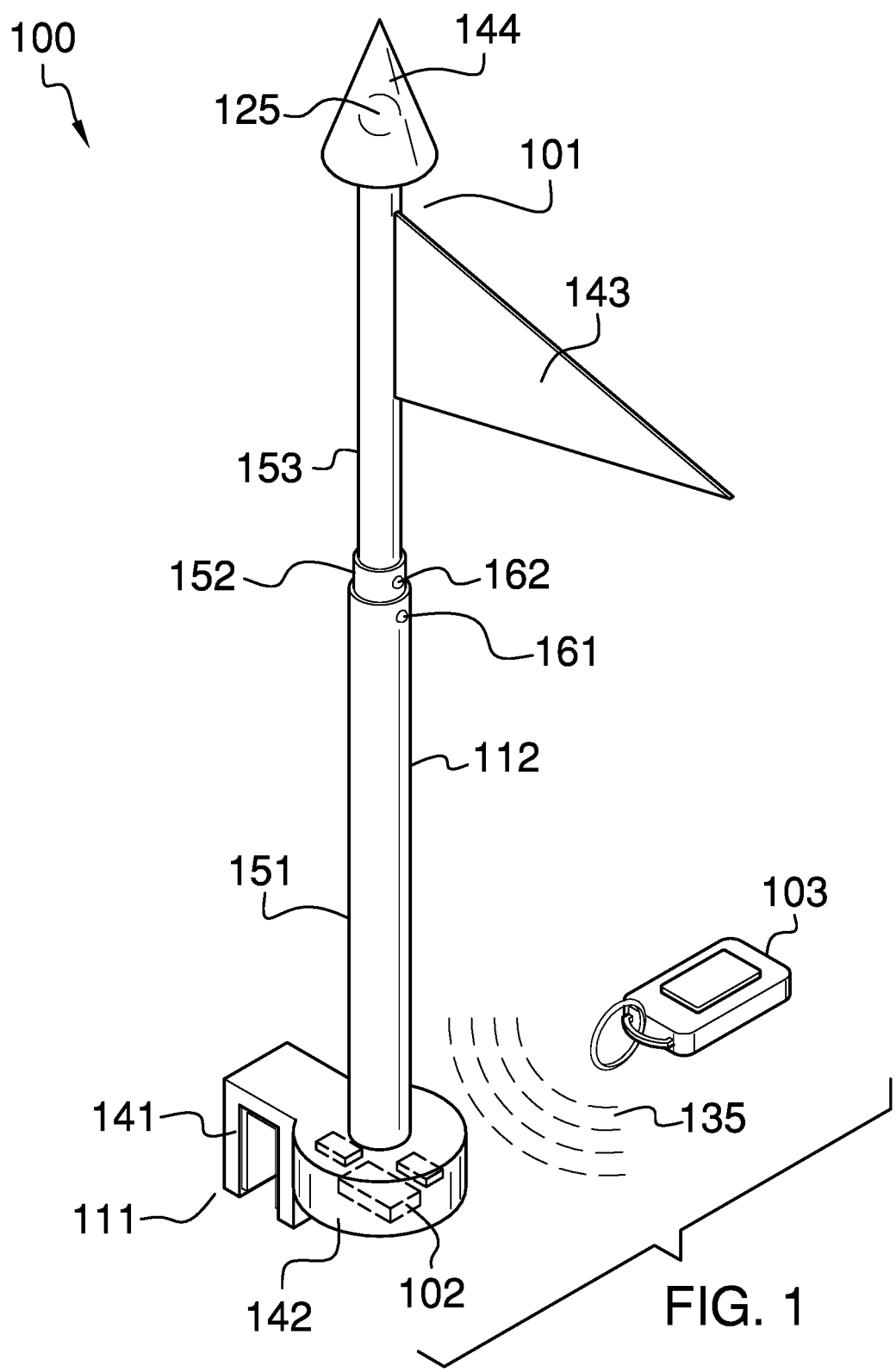
FIG. 1 is a perspective view of an embodiment of the disclosure.
Figure 2:
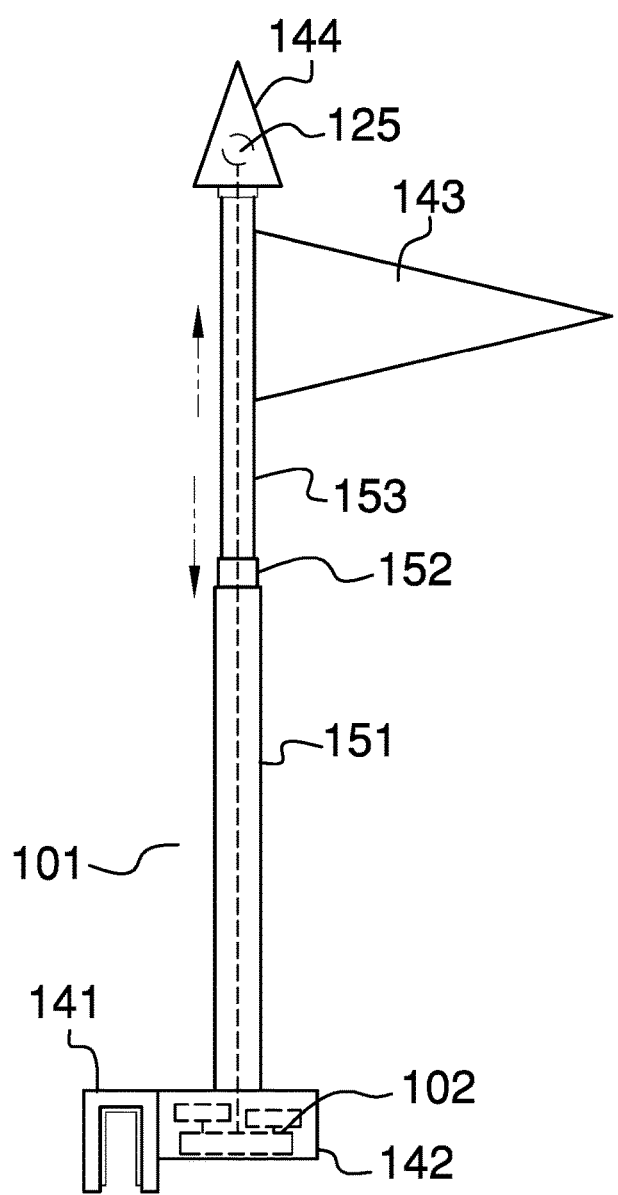
FIG. 2 is a side view of an embodiment of the disclosure.
Figure 3:
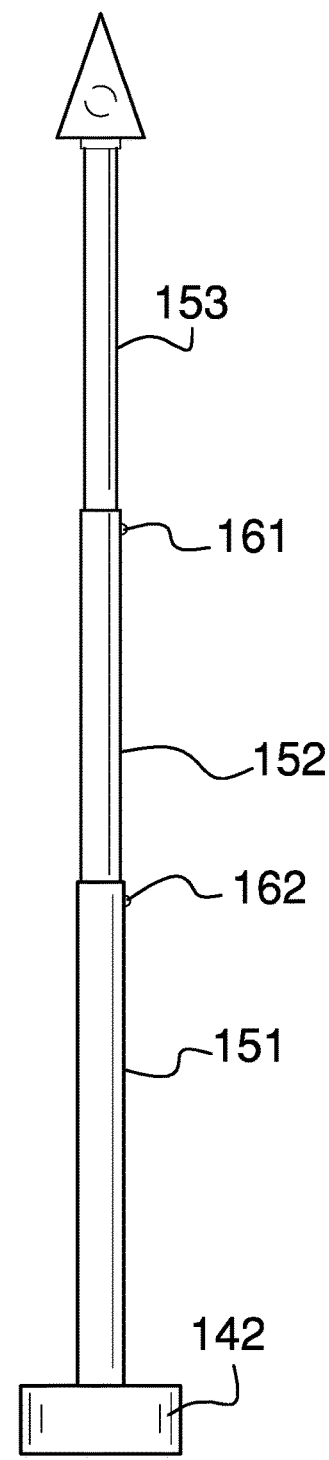
FIG. 3 is a rear view of an embodiment of the disclosure.
Figure 4:
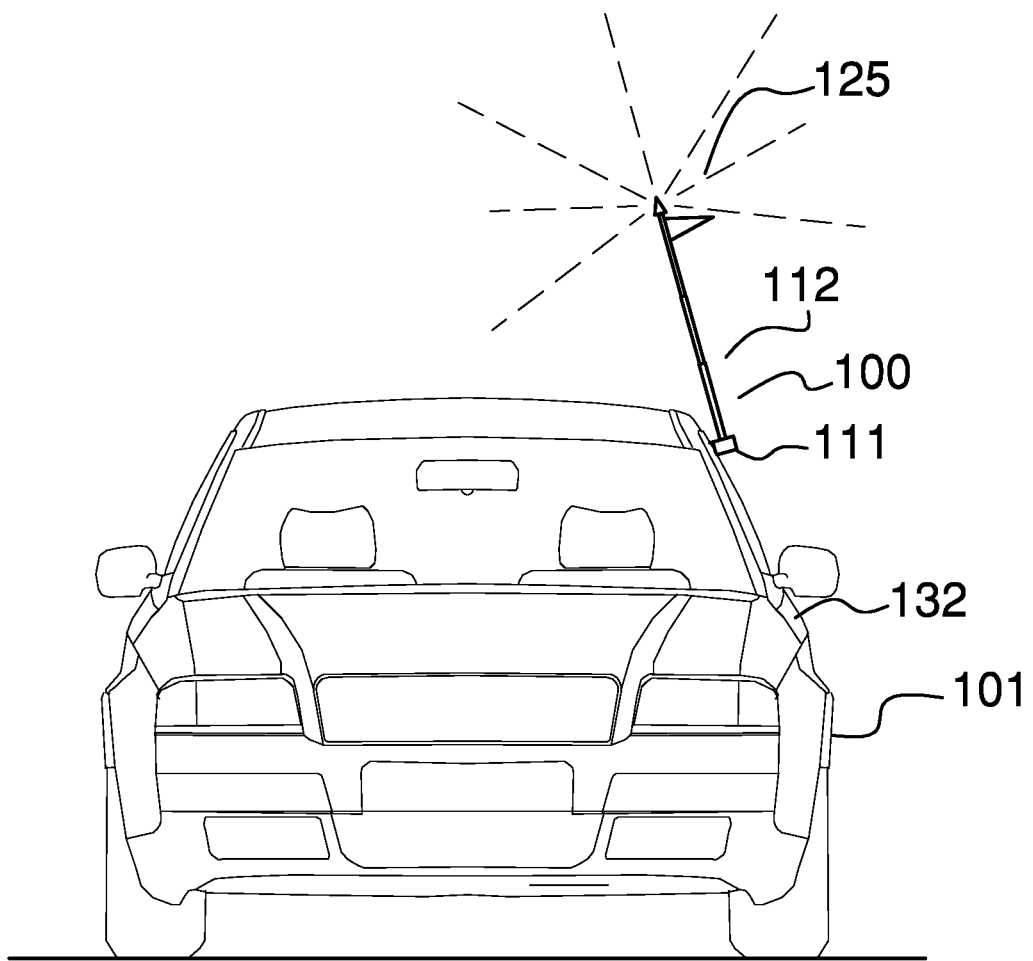
FIG. 4 is an in-use view of an embodiment of the disclosure.
Figure 5:
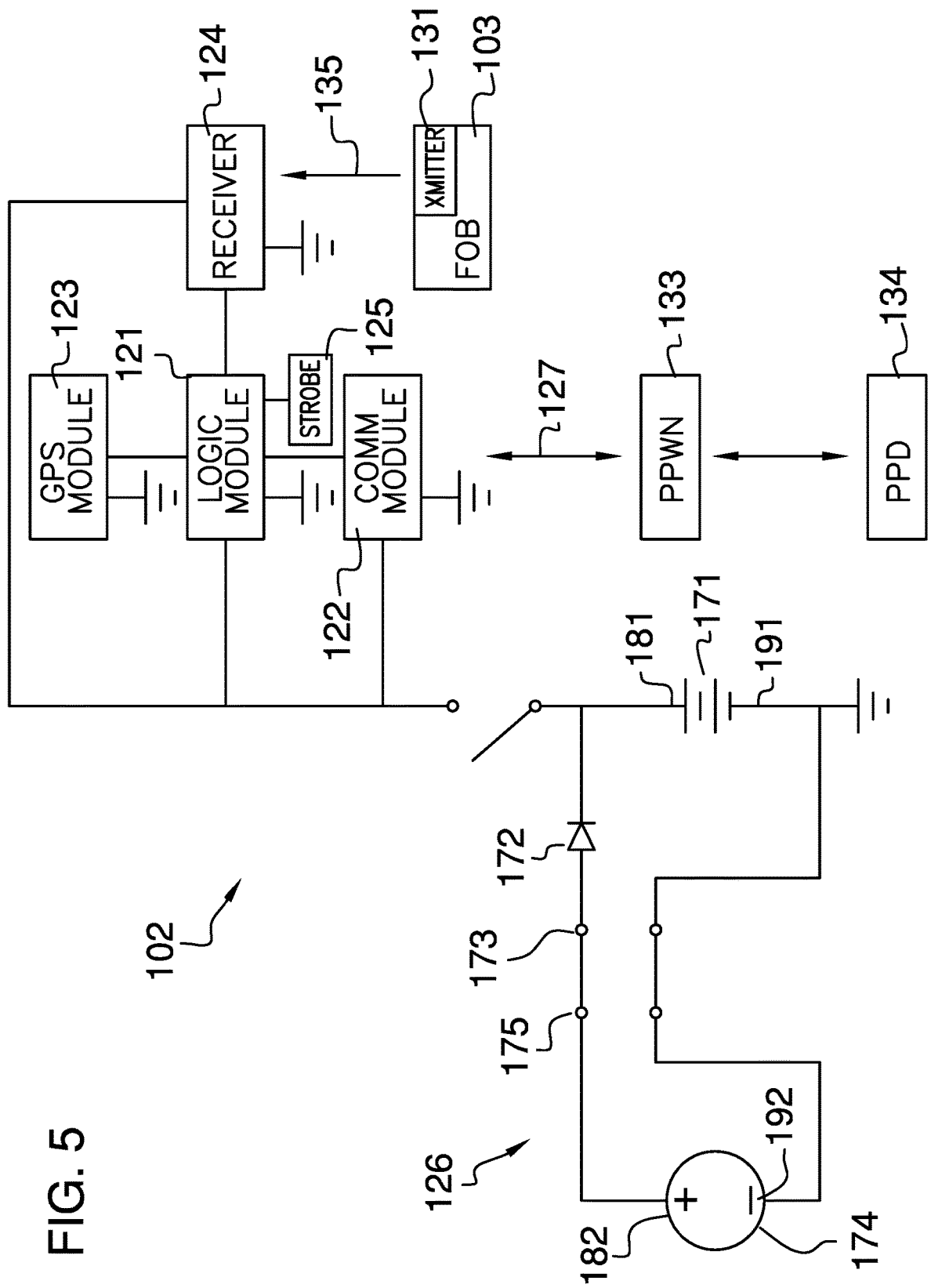
FIG. 5 is a block diagram of an embodiment of the disclosure.

Detailed reference will now be made to one or more potential embodiments of the disclosure, which are illustrated in FIGS. 1 through 5.

The vehicle-locating flag 100 (hereinafter invention) is a signal device. The invention 100 is configured for use with a vehicle 104. The vehicle 104 further comprises a door 132 and an electrical system. The invention 100 attaches to the door 132 of the vehicle 104. The invention 100 is configured for use with a fob 103. The invention 100 comprises a display structure 101 and a control circuit 102. The display structure 101 visibly displays the location of the vehicle 104. The control circuit 102 operates a strobe light 125 that draws attention to the location of the display structure 101. The control circuit 102 transmits an SMS message containing the location of the vehicle 104 over a commercially provided and publicly available cellular wireless network 133 to a personal data device 134. The fob 103 transmits a radio frequency signal 135 to initiate the operation of the control circuit 102.

The vehicle 104 is defined elsewhere in this disclosure. The door 132 is a port that provides passenger access into the vehicle 104. The commercially provided and publicly available cellular wireless network 133 is defined elsewhere in this disclosure.

The personal data device 134 is a programmable electrical device that provides data management and communication services through one or more functions referred to as an application. The application is a set of logical operating instructions that are performed by the personal data device 134. The addition of an application will provide increased functionality for the personal data device 134. This disclosure assumes that an application exists for the purpose of interacting with the invention 100. Methods to design and implement an application on a personal data device 134 are well known and documented in the electrical arts. The personal data device 134 is defined elsewhere in this disclosure.

The fob 103 is an electric circuit. The fob 103 transmits a radio frequency signal 135 that initiates the operation of the control circuit 102 from a distance. The fob 103 causes the control circuit 102 to initiate the operation of the strobe light 125 and to transmit the GPS coordinates of the invention 100 to the personal data device 134. The fob 103 further comprises a transmitter 131. The transmitter 131 further comprises the radio frequency signal 135. The radio frequency signal 135 is a controlled transmission of electromagnetic radiation used to communicate a message from the fob 103 to the control circuit 102 that initiates the operation of the control circuit 102.

The transmitter 131 is an electrical device. The transmitter 131 is a commercially available transmitter 131. The transmitter 131 is defined elsewhere in this disclosure. The transmitter 131 transmits the radio frequency signal 135 to the receiver 124 of the control circuit 102. The transmittal of the radio frequency signal 135 to the receiver 124 of the control circuit 102 initiates the operation of the control circuit 102.

The display structure 101 is a mechanical structure. The display structure 101 raises a flag 143 above the vehicle 104 such that the display structure 101 indicates the position of the vehicle 104. The display structure 101 raises the strobe light 125 above the vehicle 104 such that the strobe light 125 will draw attention towards the vehicle 104. The display structure 101 attaches to the door 132 of the vehicle 104. The display structure 101 contains the control circuit 102. The strobe light 125 is described in more detail elsewhere in this disclosure. The strobe light 125 is defined elsewhere in this disclosure. The display structure 101 comprises a pedestal 111 and a telescopic stanchion 112.

The pedestal 111 is a mechanical structure. The pedestal 111 is a rigid structure. The pedestal 111 contains the bulk of the control circuit 102. The pedestal 111 forms the final link of the load path that attaches the invention 100 to the door 132 of the vehicle 104. The pedestal 111 comprises a door clip 141 and a stanchion disk 142.

The door clip 141 is a spring-like fastening structure that clamps around the door 132 of the vehicle 104. The door clip 141 attaches the invention 100 to the door 132. The use of a door clip 141 is well-known and documented in the mechanical arts. The clip is defined elsewhere in this disclosure.

The stanchion disk 142 is a rigid structure. The stanchion disk 142 contains the control circuit 102. The stanchion disk 142 is formed with all apertures and form factors necessary to allow the stanchion disk 142 to accommodate the use, the operation, and the external connections of the control circuit 102. Methods to form a stanchion disk 142 suitable for the purposes described in this disclosure are well-known and documented in the mechanical arts. The stanchion disk 142 is a hollow disk-shaped structure. The stanchion disk 142 contains the bulk of the control circuit 102. The telescopic stanchion 112 attaches to the superior surface of the stanchion disk 142 such that the telescopic stanchion 112 projects vertically away from the stanchion disk 142 in the superior direction.

The telescopic stanchion 112 is a composite prism structure. The span of the length of the center axis of the composite prism structure of the telescopic stanchion 112 is adjustable. The telescopic stanchion 112 attaches to the pedestal 111 such that the telescopic stanchion 112 vertically projects above the roof of the vehicle 104.

The telescopic stanchion 112 is a telescopic structure that comprises a first arm 151, a second arm 152, and a first detent 161. The first detent 161 is a mechanical device that locks and secures the first arm 151 to the second arm 152. The first arm 151 is a hollow prism that is further defined with an inner dimension. The second arm 152 is a hollow prism that is further defined with an outer dimension. The second arm 152 is geometrically similar to the first arm 151. The span of the outer dimension of the second arm 152 is lesser than the span of the inner dimension of the first arm 151 such that the second arm 152 inserts into the first arm 151 in a telescopic fashion to form a composite prism structure. The span of the length of the telescopic stanchion 112 adjusts by adjusting the relative position of the second arm 152 within the first arm 151.

The position of the second arm 152 relative to the first arm 151 is held in position using the first detent 161. The first detent 161 is selected from the group consisting of a cotter pin, a G snap collar, a cam lock collar, a threaded clutch, a split collar lock, and a spring-loaded ball lock.

The telescopic stanchion 112 is a telescopic structure that further comprises a third arm 153, and a second detent 162. The second detent 162 is a mechanical device that locks and secures the third arm 153 to the second arm 152. The second arm 152 is a hollow prism that is further defined with an inner dimension. The third arm 153 is a hollow prism that is further defined with an outer dimension. The third arm 153 is geometrically similar to the second arm 152. The span of the outer dimension of the third arm 153 is lesser than the span of the inner dimension of the second arm 152 such that the third arm 153 inserts into the second arm 152 in a telescopic fashion to form a composite prism structure. The span of the length of the telescopic stanchion adjusts by adjusting the relative position of the third arm 153 within the second arm 152.

The position of the third arm 153 relative to the second arm 152 is held in position using the second detent 162. The second detent 162 is selected from the group consisting of a cotter pin, a G snap collar, a cam lock collar, a threaded clutch, a split collar lock, and a spring-loaded ball lock.

The third arm 153 further comprises a flag 143 and a keter 144. The third arm 153 of the telescopic stanchion 112 raises the flag 143 and the keter 144 to a visible position above the vehicle 104. The flag 143 is a sheeting material that attaches to the third arm 153 of the telescopic stanchion 112. The flag 143 provides a visual confirmation that the vehicle 104 marked by the invention 100 is the actual vehicle 104 being sought. The keter 144 is a hollow pyramid structure that mounts on the superior end of the telescopic stanchion 112. Specifically, the keter 144 mounts on the end of the third arm 153 that is distal from the second arm 152. The keter 144 contains the strobe light 125 of the control circuit 102. The keter 144 is a translucent structure such that the flashing light generated by the strobe light 125 is visible from the exterior of the keter 144.

The control circuit 102 is an electric circuit. The control circuit 102 receives the radio frequency signal 135 from the fob 103. The control circuit 102 illuminates the strobe light 125. The control circuit 102 identifies the location of the vehicle 104 by sending an SMS message containing the GPS coordinates of the invention 100 to the personal data device 134. The control circuit 102 is an independently powered electric circuit. By independently powered is meant that the control circuit 102 can operate without an electrical connection to an external power source 174. The control circuit 102 comprises a logic module 121, a communication module 122, a GPS module 123, a receiver 124, a strobe light 125, and a power circuit 126. The communication module 122 further comprises a wireless communication link 127. The logic module 121, the communication module 122, the GPS module 123, the receiver 124, the strobe light 125, and the power circuit 126 are electrically interconnected.

The control circuit 102 is configured for use with a commercially provided and publicly available cellular wireless network 133. The control circuit 102 is configured for use with a personal data device 134.

The logic module 121 is a readily and commercially available programmable electronic device that is used to manage, regulate, and operate the control circuit 102. The communication module 122 establishes a wireless communication link 127 with the commercially provided and publicly available cellular wireless network 133.

The communication module 122 communicates SMS and MMS messages between the logic module 121 and the personal data device 134 through a commercially provided and publicly available cellular wireless network 133. The use of a commercially provided and publicly available cellular wireless network 133 is preferred because: 1) of its low cost; 2) of the widespread availability and the broad interoperability between competing commercially provided and publicly available cellular wireless networks 133; and, 3) methods and techniques to send SMS and MMS messages over a commercially provided and publicly available cellular wireless network 133 are well known and documented by those skilled in the electrical arts.

The GPS module 123 is an electrical device that communicates with the GPS to determine the GPS coordinates of the GPS module 123. When queried by the logic module 121, the GPS module 123 transfers the GPS coordinates to the logic module 121. The SMS message sent by the communication module 122 to the personal data device 134 contains the GPS coordinates of the GPS module 123.

The logic module 121 is defined elsewhere in this disclosure. The communication module 122 is defined elsewhere in this disclosure. The GPS module 123 is defined elsewhere in this disclosure.

The receiver 124 is an electrical device. The receiver 124 is a commercially available receiver 124. The receiver 124 receives a radio frequency signal 135 transmitted by the transmitter 131 of the fob 103. The receiver 124 forwards the received radio frequency signal 135 to the logic module 121. The logic module 121 initiates the operation of the strobe light 125 upon receipt of the radio frequency signal 135 from the receiver 124. The logic module 121 transmits the SMS message containing the GPS coordinates of the GPS module 123 upon receipt of the radio frequency signal 135 from the receiver 124.

The receiver 124 is defined elsewhere in this disclosure. In the first potential embodiment of the receiver 124 and the transmitter 131 are provisioned through the use of a commercially available 433 MHz remote control switch and transmitter kit.

The strobe light 125 is a commercially available strobe light 125. The strobe light 125 generates a flashing illumination that directs attention towards the vehicle 104. The logic module 121 controls the operation of the strobe light 125. The strobe light 125 mounts in the keter 144 of the third arm 153 of the telescopic stanchion 112 such that the strobe light 125 forms a portion of the superior structure of the invention 100. The strobe light 125 is defined elsewhere in this disclosure.

The power circuit 126 is an electrical circuit. The power circuit 126 powers the operation of the control circuit 102. The power circuit 126 is an electrochemical device. The power circuit 126 converts chemical potential energy into the electrical energy required to power the control circuit 102. The power circuit 126 comprises a battery 171, a diode 172, a charging plug 173, and an external power source 174. The external power source 174 further comprises a charging port 175. The battery 171 is further defined with a first positive terminal 181 and a first negative terminal 191. The external power source 174 is further defined with a second positive terminal 182 and a second negative terminal 192.

The battery 171, the diode 172, the charging plug 173, the external power source 174, and the charging port 175 are electrically interconnected.

The battery 171 is an electrochemical device. The battery 171 converts chemical potential energy into the electrical energy used to power the control circuit 102. The battery 171 is a commercially available rechargeable battery 171. The chemical energy stored within the rechargeable battery 171 is renewed and restored through the use of the charging plug 173. The charging plug 173 is an electrical circuit that reverses the polarity of the rechargeable battery 171 and provides the energy necessary to reverse the chemical processes that the rechargeable battery 171 initially used to generate the electrical energy. This reversal of the chemical process creates a chemical potential energy that will later be used by the rechargeable battery 171 to generate electricity.

The charging plug 173 forms an electrical connection to an external power source 174 using the charging port 175. The charging port 175 forms a detachable electrical connection with the charging plug 173. The charging plug 173 receives electrical energy from the external power source 174 through the charging port 175. The diode 172 is an electrical device that allows current to flow in only one direction. The diode 172 installs between the rechargeable battery 171 and the charging plug 173 such that electricity will not flow from the first positive terminal 181 of the rechargeable battery 171 into the second positive terminal 182 of the external power source 174.

In the first potential embodiment of the disclosure, the external power source 174 and the charging port 175 are provisioned through the vehicle 104. The external power source is the electrical system of the vehicle 104. The charging port 175 is the cigarette lighter port of the vehicle 104. The charging plug 173 is a cigarette lighter plug.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cigarette Lighter Plug: As used in this disclosure, a cigarette lighter plug is a standardized electrical connection that attaches an electrically powered device to the electric power system of a vehicle.

Clip: As used in this disclosure, a clip is a fastener that attaches to an object by gripping or clasping the object. A clip is typically spring loaded.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Domestic Article: As used in this disclosure, a domestic article is an item or object: 1) that is commonly found within a household; or, 2) that is commonly carried or worn by a person. Examples of domestic articles include, but are not limited to, clothing, keys, and key fobs, personal data devices, glasses, remote controls, or personal storage items such as purses, briefcases, wallets, or cases.

External Power Source: As used in this disclosure, an external power source is a source of the energy that is externally provided to enable the operation of the present disclosure. Examples of external power sources include, but are not limited to, electrical power sources and compressed air sources.

Flag: As used in this disclosure, a flag is a textile or sheeting material that attaches by one edge to a pole or a rope. In general usage, a flag will display an image that often contains some form of symbolic meaning or message. This definition maps to the common patent classification definitions and is therefore explicitly intended to include flag-like objects commonly referred to as a "banner".

Fob: As used in this disclosure, a fob is a container that: a) contains an electric circuit; and, b) is carried by a person as a domestic article.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Housing: As used in this disclosure, a housing is a rigid structure that encloses and protects one or more devices.

Keter: As used in this disclosure, a keter is an end piece that attaches to one of the congruent ends of a prism-shaped structure.

Lamp: As used in this disclosure, a lamp is an electrical device that generates (typically visible spectrum) electromagnetic radiation.

LED: As used in this disclosure, an LED is an acronym for a light emitting diode. A light emitting diode is a diode that is also a light source.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

PDD: As used in this disclosure, PDD is an acronym for personal data device.

Pedestal: As used in this disclosure, a pedestal is an intermediary load bearing structure that that forms a load between a between two objects or structures.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

PPWN: As used in this disclosure, the PPWN is an acronym for a publically provided wireless network. The PPWN refers to a commercially provided and publicly available cellular wireless network.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Receiver: As used in this disclosure, a receiver is a device that is used to receive and demodulate electromagnetic radiation such as radio signals.

Rigid Structure: As used in this disclosure, a rigid structure is a solid structure formed from an inelastic material that resists changes in shape. A rigid structure will permanently deform as it fails under a force.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Strobe Light: As used in this disclosure, a strobe light is a device that is used to generate flashes of light at regular intervals.

Telescopic: As used in this disclosure, telescopic is an adjective that describes an object made of sections that fit or slide into each other such that the object can be made longer or shorter by adjusting the relative positions of the sections.

Translucent: As used in this disclosure, translucent refers to a material that allows light to pass through the material but that significantly scatters the light such that an object cannot be clearly seen through the material.

Transmitter: As used in this disclosure, a transmitter is a device that is used to generate and transmit electromagnetic radiation such as radio signals.

Vehicle: As used in this disclosure, a vehicle is a motorized device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle locating apparatus comprising
a display structure and a control circuit;
wherein the display structure visibly displays the location of the vehicle;
wherein the control circuit transmits an SMS message containing the location of the vehicle over a commercially provided and publicly available cellular wireless network to a personal data device;

wherein the vehicle locating apparatus is a signal device;

wherein the vehicle locating apparatus is configured for use with a vehicle;

wherein the vehicle further comprises a door and an electrical system;

wherein the vehicle locating apparatus attaches to the door of the vehicle;

wherein the control circuit comprises a logic module, a communication module, a GPS module, a receiver, a strobe light, and a power circuit;

wherein the logic module, the communication module, the GPS module, the receiver, the strobe light, and the power circuit are electrically interconnected;

wherein the control circuit illuminates the strobe light;

wherein the control circuit is configured for use with the commercially provided and publicly available cellular wireless network;

wherein the control circuit is configured for use with the personal data device;

wherein the power circuit is an electrical circuit;

wherein the power circuit powers the operation of the control circuit;

wherein the power circuit is an electrochemical device;

wherein the power circuit comprises a battery, a diode, a charging plug, and an external power source;

wherein the external power source further comprises a charging port;

wherein the battery is further defined with a first positive terminal and a first negative terminal;

wherein the external power source is further defined with a second positive terminal and a second negative terminal;

wherein the battery, the diode, the charging plug, the external power source, and the charging port are electrically interconnected;

wherein the battery is a rechargeable battery;

wherein the charging plug is an electrical circuit that reverses the polarity of the rechargeable battery and provides the energy necessary to reverse the chemical processes that the rechargeable battery initially used to generate the electrical energy;

wherein the charging plug forms an electrical connection to an external power source using the charging port;

wherein the charging port forms a detachable electrical connection with the charging plug;

wherein the charging plug receives electrical energy from the external power source through the charging port;

wherein the diode is an electrical device that allows current to flow in only one direction;

wherein the diode installs between the rechargeable battery and the charging plug such that electricity will not flow from the first positive terminal of the rechargeable battery into the second positive terminal of the external power source;

wherein the external power source is the electrical system of the vehicle;

wherein the charging port is the cigarette lighter port of the vehicle;

wherein the charging plug is a cigarette lighter plug.

2. The vehicle locating apparatus according to claim 1 wherein the vehicle locating apparatus is configured for use with a fob;

wherein the fob transmits a radio frequency signal to initiate the operation of the control circuit.

3. The vehicle locating apparatus according to claim 2 wherein the personal data device is a programmable electrical device;

wherein the personal data device provides data management and communication services.

4. The vehicle locating apparatus according to claim 3 wherein the fob is an electric circuit;

wherein the fob transmits a radio frequency signal that initiates the operation of the control circuit.

5. The vehicle locating apparatus according to claim 4 wherein the fob further comprises a transmitter;

wherein the transmitter is an electrical device;

wherein the transmitter transmits the radio frequency signal to the receiver of the control circuit;

wherein the radio frequency signal is a controlled transmission of electromagnetic radiation used to communicate a message from the fob to the control circuit that initiates the operation of the control circuit.

6. The vehicle locating apparatus according to claim 5 wherein the display structure is a mechanical structure;

wherein the display structure attaches to the door of the vehicle;

wherein the display structure contains the control circuit.

7. The vehicle locating apparatus according to claim 6 wherein the control circuit is an electric circuit;

wherein the control circuit receives the radio frequency signal from the fob;

wherein the control circuit identifies the location of the vehicle by sending an SMS message containing the GPS coordinates of the vehicle locating apparatus to the personal data device;

wherein the control circuit is an independently powered electric circuit;

wherein by independently powered is meant that the control circuit can operate without an electrical connection to an external power source.

8. The vehicle locating apparatus according to claim 7 wherein the display structure comprises a pedestal and a telescopic stanchion;

wherein the telescopic stanchion attaches to the pedestal such that the telescopic stanchion vertically projects above the vehicle.

9. The vehicle locating apparatus according to claim 8 wherein the pedestal is a mechanical structure;

wherein the pedestal is a rigid structure;

wherein the pedestal contains the bulk of the control circuit;

wherein the pedestal forms the final link of the load path that attaches the vehicle locating apparatus to the door of the vehicle.

10. The vehicle locating apparatus according to claim 9 wherein the telescopic stanchion attaches to the superior surface of the stanchion disk such that the telescopic stanchion projects vertically away from a stanchion disk in the superior direction;

wherein the telescopic stanchion is a composite prism structure;

wherein the span of the length of the center axis of the composite prism structure of the telescopic stanchion is adjustable.

11. The vehicle locating apparatus according to claim 10 wherein the pedestal comprises a door clip and a stanchion disk;

wherein the door clip attaches the vehicle locating apparatus to the door;

wherein the door clip is a fastening structure that attaches to the door of the vehicle;

wherein the stanchion disk is a rigid structure;

wherein the stanchion disk is a hollow disk-shaped structure;
wherein the stanchion disk contains the control circuit.

12. The vehicle locating apparatus according to claim 11
wherein the telescopic stanchion is a telescopic structure that comprises a first arm, a second arm, and a first detent;
wherein the first detent is a mechanical device that locks and secures the first arm to the second arm;
wherein the first arm is a hollow prism that is further defined with an inner dimension;
wherein the second arm is a hollow prism that is further defined with an outer dimension;
wherein the second arm is geometrically similar to the first arm;
wherein the span of the outer dimension of the second arm is lesser than the span of the inner dimension of the first arm such that the second arm inserts into the first arm in a telescopic fashion to form a composite prism structure;
wherein the span of the length of the telescopic stanchion adjusts by adjusting the relative position of the second arm within the first arm;
wherein the position of the second arm relative to the first arm is held in position using the first detent.

13. The vehicle locating apparatus according to claim 12
wherein the telescopic stanchion is a telescopic structure that further comprises a third arm and a second detent;
wherein the second detent is a mechanical device that locks and secures the third arm to the second arm;
wherein the second arm is a hollow prism that is further defined with an inner dimension;
wherein the third arm is a hollow prism that is further defined with an outer dimension;
wherein the third arm is geometrically similar to the second arm;
wherein the span of the outer dimension of the third arm is lesser than the span of the inner dimension of the second arm such that the third arm inserts into the second arm in a telescopic fashion to form a composite prism structure;
wherein the span of the length of the telescopic stanchion adjusts by adjusting the relative position of the third arm within the second arm;
wherein the position of the third arm relative to the second arm is held in position using the second detent.

14. The vehicle locating apparatus according to claim 13
wherein the third arm further comprises a flag and a keter;
wherein the third arm of the telescopic stanchion raises the flag and the keter to a visible position above the vehicle;
wherein the flag is a sheeting material that attaches to the third arm of the telescopic stanchion;
wherein the keter mounts on the end of the third arm that is distal from the second arm;
wherein the keter contains the strobe light of the control circuit;
wherein the keter is a translucent structure.

15. The vehicle locating apparatus according to claim 14
wherein the logic module is a programmable electronic device;
wherein the communication module establishes the wireless communication link to the commercially provided and publicly available cellular wireless network;
wherein the communication module communicates SMS and MMS messages between the logic module and the personal data device through a commercially provided and publicly available cellular wireless network;
wherein the GPS module is an electrical device that communicates with the GPS to determine the GPS coordinates of the GPS module;
wherein the GPS module transfers the GPS coordinates to the logic module;
wherein the SMS message sent by the communication module to the personal data device contains the GPS coordinates of the GPS module.

16. The vehicle locating apparatus according to claim 15
wherein the receiver is an electrical device;
wherein the receiver is a commercially available receiver;
wherein the receiver receives the radio frequency signal transmitted by the transmitter of the fob;
wherein the receiver forwards the received radio frequency signal to the logic module;
wherein the logic module initiates the operation of the strobe light upon receipt of the radio frequency signal from the receiver;
wherein the logic module transmits the SMS message containing the GPS coordinates of the GPS module upon receipt of the radio frequency signal from the receiver.

17. The vehicle locating apparatus according to claim 16
wherein the strobe light generates a flashing illumination that directs attention towards the vehicle;
wherein the logic module controls the operation of the strobe light;
wherein the strobe light mounts in the keter of the third arm of the telescopic stanchion such that the strobe light forms a portion of the superior structure of the vehicle locating apparatus.

18. The vehicle locating apparatus according to claim 17 wherein the receiver and the transmitter comprises a 433 MHz remote control switch and transmitter.

* * * * *